United States Patent [19]

Weiland

[11] 4,153,390
[45] May 8, 1979

[54] HELICOPTER ROTOR STRUCTURE

[75] Inventor: Emil Weiland, Hohenbrunn, Fed. Rep. of Germany

[73] Assignee: Messerschmitt-Boelkow-Blohm Gesellschaft mit beschrankter Haftung, Munich, Fed. Rep. of Germany

[21] Appl. No.: 824,093

[22] Filed: Aug. 12, 1977

[30] Foreign Application Priority Data

Aug. 25, 1976 [DE] Fed. Rep. of Germany ....... 2638167

[51] Int. Cl.$^2$ ............................................. B64C 27/38
[52] U.S. Cl. ................... 416/138; 416/141; 416/134 A
[58] Field of Search .......... 416/132 R, 138 A, 134 A, 416/140 A, 141

[56] References Cited

U.S. PATENT DOCUMENTS

| | | | |
|---|---|---|---|
| 3,470,962 | 10/1969 | Cure | 416/141 |
| 3,578,877 | 5/1971 | Mautz | 416/136 X |
| 3,879,153 | 4/1975 | Breuner | 416/141 |
| 3,880,551 | 4/1975 | Kisovec | 416/134 A |
| 4,008,980 | 2/1977 | Noehren et al. | 416/230 A X |

FOREIGN PATENT DOCUMENTS 1190259 4/1970 United Kingdom ..................... 416/134

Primary Examiner—Everette A. Powell, Jr.
Attorney, Agent, or Firm—W. G. Fasse; D. F. Gould

[57] ABSTRACT

The present rotor structure for rotary wing aircraft, such as helicopters, is constructed to minimize the mass unbalance which normally occurs due to the lead-lag of the rotor blades or wings. For this purpose all the bearings supporting the rotors on the rotor heads are constructed as bearings permitting an axial movement of the tension bars which interconnect the wings of a pair of wings. In addition, the wing interconnecting bars are bending-resistant and connected with each other at their crossing point by a centering device which is freely movable in the rotor plane and relative to the rotor head. The connection of the bars by the centering device is rigid in the longitudinal, axial direction of the tension bars.

6 Claims, 3 Drawing Figures

HELICOPTER ROTOR STRUCTURE

BACKGROUND OF THE INVENTION

The present invention relates to a rotor structure for rotary wing aircraft, such as helicopters having a rotor head on which the rotor blades or wings are supported for rotation without any lagging hinges or without any lagging hinges and without any flapping hinges, however in a non-rigid manner, whereby, in the case of a four wing rotor structure, to tension bars which cross each other, interconnect the rotor blades in pairs. The tension bars are resistant or substantially resistant against tension stress and bending moments. The tension bars are supported on the rotor head by a bearing means which are angularly movable in the lead-lag direction and which are radially spaced on both sides from the rotational axis of the rotor shaft.

In connection with conventional rotor structures for rotary wing aircraft it is not avoided that the common mass center of gravity of two rotor wings arranged diametrically opposite each other, is displaced radially outwardly from its central position coinciding with the rotational axis of the rotor shaft. Such displacement or excursion takes place when the two wings do not lead-lag in the same direction simultaneously and/or when they do not lag by the same angle. Such an excursion of the center of gravity is largest when the lag angle is of equal size for both wings while the wings of a pair arranged opposite each other lag in opposite lagging directions. This condition is referred to as the so-called symmetric lag-bending form. As a result of such a lag-bending form, a temporary mass unbalance is produced which subjects the rotor and its bearing means to substantial loads. Besides, such lag-bending form causes rather very disturbing vibrations.

OBJECTS OF THE INVENTION

In view of the above it is the aim of the invention to achieve the following objects singly or in combination:

to balance at least partially the mass unbalance which is caused in rotary wing aircrafts by the lagging movement of the rotor wings;

to support the blade interconnecting tension bars in such a manner that all bearing points permit a movement in the longitudinal axial direction of the tension bars;

to permit a relative motion of the tension bars in the direction of the rotational axis of the rotor shaft;

to make the tension bars elastic relative to torsion loads; and to construct the tension carrier bars and their support bearings in such a manner that the bars may be rotated in unison with the motion of the wings resulting from the cyclic control of the pitch angle of the wings.

SUMMARY OF THE INVENTION

According to the invention there is provided a rotor structure for a rotary wing aircraft which is characterized in that all support bearings between each carrier beam and the rotor head are constructed to permit an axial movement of the respective carrier bar and that the carrier bars are connected with each other by a centering device in a manner rigid in the longitudinal axial direction of the carrier bars, said centering device being arranged at the crossing of the carrier bars. In addition, the centering device is freely movable in the plane of rotation of the rotor wings relative to the rotor head.

According to the invention, both rotor blades are supported by the rotor head for axial excursions in the longitudinal direction of the wings or blades because the bearings between the rotor head and the wings are constructed as axially loose bearings permitting such movement. Each pair of blades is secured against axial excursions relative to the other pair of blades by the centering device.

In operation, if an excursion of the center of gravity takes place due to a lead-lag movement of the blades of a pair, the carrier bar interconnecting the members of such pair of blades bends in a direction opposite to the center of gravity excursion and in the range or area of the rotational axis of the rotor shaft. As a result of such bending the bar displaces the respective other pair of blades in the axial direction of said other pair of blades due to the coupling of the interconnecting bars by the centering device. As a result of such displacement the center of gravity of the other pair of blades is shifted in a direction opposite to the center of gravity excursion in the lead-lag direction of the first mentioned pair of blades. The just described motions achieve at least a partial mass balancing which has the advantage that vibration causing effects are diminished. This principle of mass balancing may be applied not only to rotors comprising four blades or wings, but also to rotors having a larger even number of blades.

In an embodiment in which the rotor blades are supported on the rotor head in a non-rigid manner and without any flapping hinges as well as without any lagging hinges, the bearings are angularly movable also in the flapping direction.

Further, in such an embodiment it is advantageous that the centering device permits a relative motion of the carrier beam in the longitudinal direction of the rotational axis of the rotor shaft, whereby the carrier beams may be bent in the flapping direction independently of each other. According to a further embodiment of the invention wherein the bearings which support the blades rotatably on the rotor head are constructed as blade angle bearings to permit the adjustment of the pitch angle, and wherein the rotor blades are connected to the tension bars in a manner rigid against rotation, the centering device comprises, as a preferred embodiment, two axial bearings, each cooperating with a respective carrier beam in such a manner that the carrier beams can be rotated in unison with the rotor blade connected to the carrier beams, said rotation taking place about the longitudinal axis of the blades or wings. In such an embodiment the axial bearings are preferably constructed to simultaneously function also as radial bearings. Moreover, the bearings are arranged so as to be displaceable relative to each other in the direction of the rotational axis of the rotor shaft, whereby a structurally simple assembly is accomplished which permits a bending of the carrier beams independently of each other in the flapping direction.

The carrier beams are suitably rotatable between their ends through an angle corresponding to the movement of the wings which the latter perform for the collective adjustment of the pitch angle. This feature in combination with the rotatable supporting of the carrier beams on the centering device has the advantage that the carrier beams may be rotated in unison with the corresponding pair of wings. During the cyclical adjustment of the pitch angle two blades or wings opposite each other form a pair and are tilted in the same direction and by the same angular excursion, thus, merely during the collective adjustment of the pitch angle of all blades or wings is it necessary to twist the carrier bars between their ends. For this purpose the carrier bars are suitably made to be elastic against torsion loads and are constructed of fiber reinforced synthetic material, whereby a structurally simple lightweight assembly is achieved.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
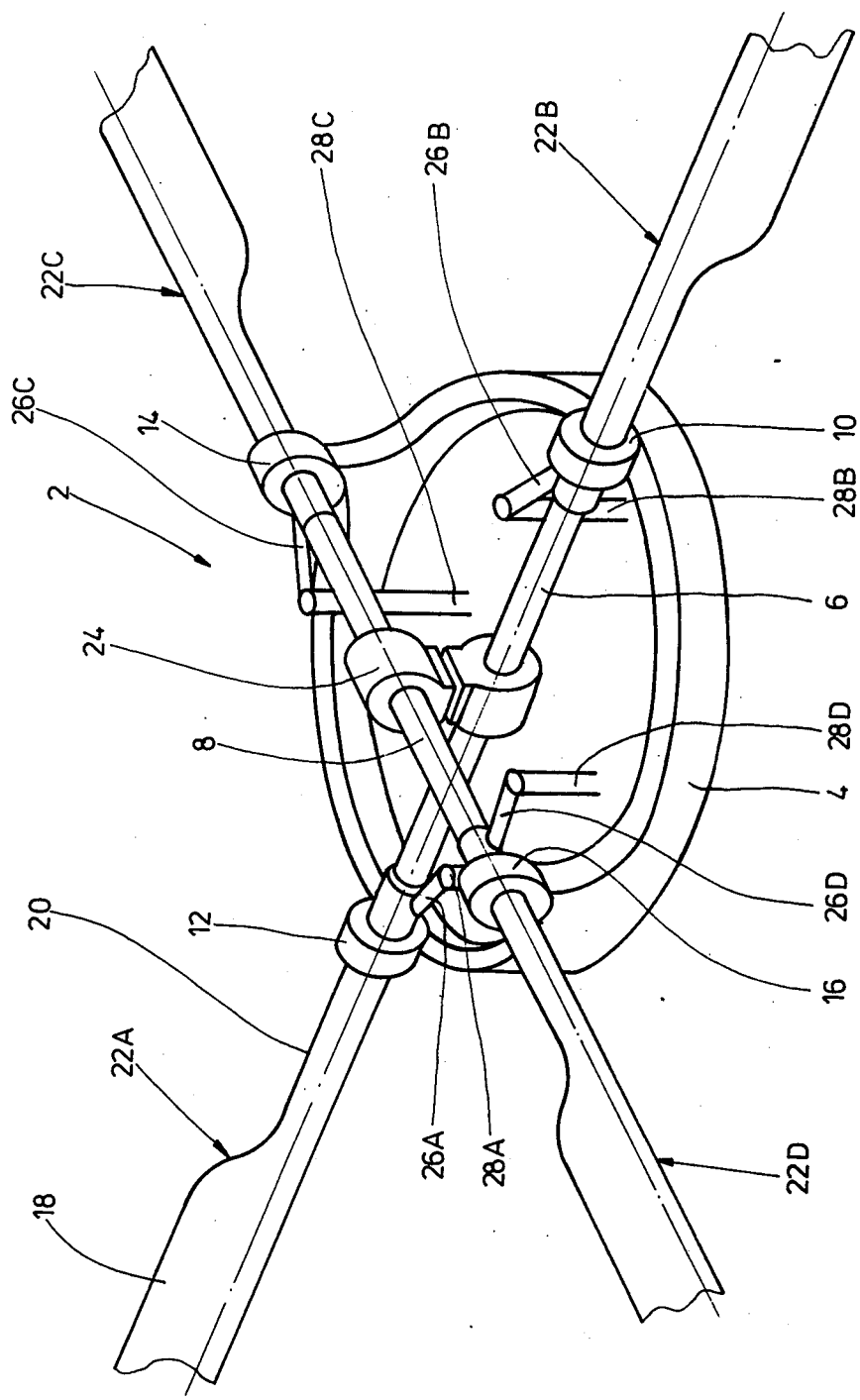
FIG. 1 is a schematic, perspective illustration of a four wing rotor according to the invention.

Referring to FIG. 1, the rotor 2 comprises four blades supported on a rotor head, the ring 4 of which is supported by a rotor bearing not shown, but directly secured to the helicopter or rotary wing aircraft body to be rotatable relative to such body. The rotor is driven through the rotor shaft through conventional propulsion and gear means not shown. Two carrier bars 6 and 8, forming part of the rotor structure or assembly, are rotatably supported on the rotor head 4 at the ends of these bars 6, 8 by means of blade angle bearings 10 and 12, as well as 14 and 16. The bars 6, 8 cross each other in the area of the rotational axis of the rotor shaft and at right angles relative to each other. These bars 6 and 8 are substantially resistant against tension forces and bending moment loads. Preferably, the bars 6, 8 are made of fiber reinforced synthetic material, whereby the direction of extension of the fibers is in the longitudinal direction of the bars. The two bars 6, 8 are spaced from each other in the direction of the rotational axis of the rotor shaft. Each of these bars extends in a plane which in turn extends substantially perpendicularly to the rotational axis of the rotor shaft. The end of each bar 6, 8 is connected to the respective neck section 20 of the rotor blades 22A, 22B, or 22C and 22D. The connection between the bar end and the respective neck is located radially outside of the respective blade angle bearings 10, 12, 14 and 16. Each wing comprises a blade section 18 and the mentioned neck section 20 which is resistant against torsion moments, but sufficiently yielding relative to bending in the flapping direction and in the lead-lag direction.

The blade angle bearings 10, 12, 14 and 16 are constructed as so-called loose bearings permitting an axial relative movement between the bearings and the respective end of the carrier bar 6, 8. Thus, the carrier bar 6 or 8 and the respective pair of blades 22A, 22B or 22C, 22D form an integral structural unit capable of moving in unison in the direction of the longitudinal axis of the blades and the longitudinal axis of the respective bar relative to the rotor head 4. Further, these axially loose bearings 10, 12, 14 and 16 also permit angular movements in the manner of pivot or self-aligning bearings so that the forces effective at each blade pair 22A, 22B or 22C, 22D cannot be effective on the rotor head 4 as bending moments, but are rather transmitted to the respective carrier bar 6 or 8, whereby they are compensated by the corresponding bending of the bar 6 or 8 in the flapping direction and in the lead-lag direction.

According to the invention a centering device 24 is provided for centering the bars 6 and 8 and, with these bars, the blade pairs at the rotor head 4. The centering device firmly holds the bars 6 and 8 relative to each other in the axial direction of the respective bars. The structure of the centering device 24 connecting the bars 6 and 8 to each other is described in detail with reference to FIG. 2. The centering device 24 permits a rotation of the bars 6 and 8 about their longitudinal axis so that each bar may rotate in unison during the cyclical adjustment of the pitch angle, whereby the bar and the respective blades forming a pair are adjusted as a unitary structure, said rotation about the longitudinal blade axis taking place in the centering device 24 and in the blade angle bearings 10, 12, or 14 and 16 located radially outwardly relative to said centering device. During the collective blade angle adjustment a twisting of the respective bar between its ends is necessary. This may be accomplished by making the bars 6, 8 to be elastic relative to torsion moments and within predetermined limits. In order to provide a good rigidity or strength against tension loads and bending moments while simultaneously providing a high torsional elasticity, it may be desirable or practical to construct each bar 6, 8 to have, instead of the illustrated circular cross section, an open hollow cross-section, for example, in the shape of a U-section or in the shape of an I-section. Said section would have high strength boom or marginal zones interconnected at least in certain areas by relatively thin webs, and made of superimposed belts of synthetic material reinforced by fiber materials, whereby layers of elastomeric materials are embedded between such belts of synthetic material.

The rotation or twisting of the bars 6, 8 is accomplished by means of control members or horns 26A, 26B, 26C, and 26D connected radially inwardly of the blade angle bearings, to the bars 6 and 8. The steering or control horns are adjusted in a conventional manner by means of respective control rods 28A, or 28B, or 28C, or 28D by means of a wobble plate not shown for adjusting the angular movement of the respective blade.

Figure 2:
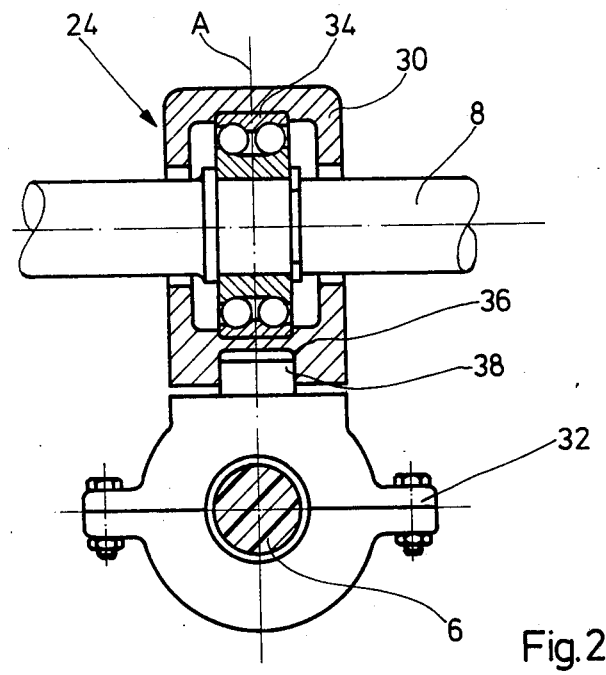
FIG. 2 is a sectional view through the centering device which interconnects the carrier beams in the area where they cross each other.

FIG. 2 illustrates the centering device 24 having upper and lower divided bearing shells 30 and 32. The upper bar 8 is connected with the bearing shell 30 by means of a bearing 34 which is effective in the axial and radial direction permitting rotation between the bar 8 and the shell 30, but preventing a relative tilting therebetween as well as an axial displacement. The lower bar 6 is connected in the same manner through a radially and axially effective bearing (not shown) with the bearing shell 32 for cooperation therewith. Both bearing shells 30 and 32 are displaceable relative to each other by a bolt 38 in the direction of the rotational axis A of the rotor shaft, said bolt 38 extending into a bore 36 of the upper bearing shell 30. However, the bearing shells are interconnected rigidly against tilting and against relative movement in the direction of a plane extending perpendicularly to the rotational axis A of the rotor shaft. Due to the relative displacement of the bearing shells 30, 32 in the direction of the axis A, it is possible for the bars 6, 8 to bend independently of each other in the flapping direction.

Figure 3:
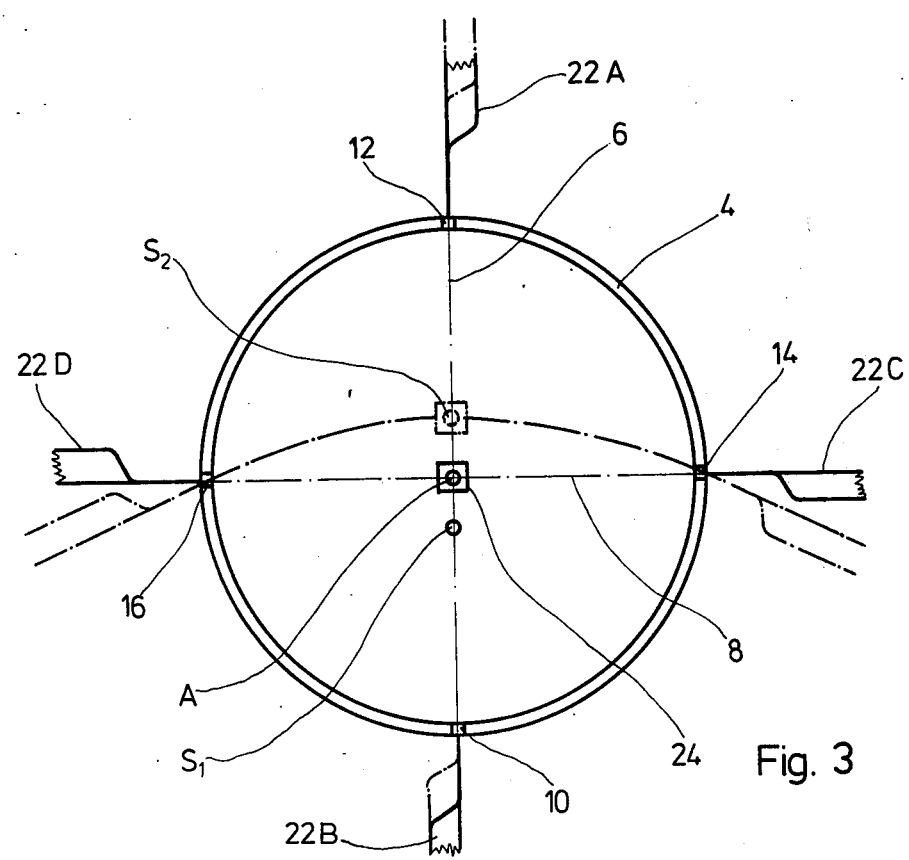
FIG. 3 is a plan view of the rotor, according to FIG. 1, in a substantially simplified illustration for explaining the mass balancing.

As long as the rotor blades 22A to 22D do not perform any lagging motion, the center of gravity of each structural unit comprising a beam 6, 8 and a pair of blades 22A, 22B or 22C, and 22D is centered in the rotational axis A of the rotor shaft, whereby the bars 6 and 8 support each other at the crossing by means of the centering device 24. However, if the rotor blades follow an excursion in the lead-lag direction, the common center of gravity travels out of the rotational axis A as shown by dash-dotted lines in FIG. 3 for the blade pair 22C and 22D, taking into account a symmetric lag-bending form, whereby the common mass center of gravity is displaced from the point A in FIG. 3, to the point $S_1$ in FIG. 3. As a result, the interconnecting bar 8 which interconnects the respective blades 22C and 22D is also bent, however, in a direction opposite to that of the excursion of the center of gravity. As a result, the bending bar 8 entrains the bar 6 through the centering device 24 and thus the blade pair 22A, 22B secured to the bar 6 so that their common center of gravity is displaced in the direction contrary to the excursion of the center of gravity of the displaced blade pair 22C, 22D, radially away from the rotational axis A, of the rotor shaft to the point $S_2$. This just described operation assures at least a partial balancing compensation of the center of gravity excursion occurring as a result of the lead-lag of the blades, whereby a reduction in the loads on the rotor caused by the unbalance, is accomplished. Simultaneously, vibration tendencies are also substantially reduced. This principle of displacing the center of gravity in opposite directions for the purpose of achieving a mass balancing may be employed in an equally effective manner in rotors having more than four even numbered blades.

As illustrated, the bars 6, 8 are supported by anti-friction bearings. However, instead it is also possible to use in the same manner slide bearings or elastomeric bearings. Further, where the bars 6, 8 have different cross sections, such as an open U-cross section, the two radial-axial bearings of the centering device 24 may be arranged in the openings or recesses in the bars 6, 8 to reduce the relative spacing between these bars, whereby the bearings would be constructed as so-called inner bearings.

Although the invention has been described with reference to specific example embodiments, it will be appreciated, that it is intended to cover all modifications and equivalents within the scope of the appended claims.

What is claimed is:

1. A rotor structure for a rotary wing aircraft, comprising rotor head means having a central rotational axis, rotor blade or wing means including blade root means and arranged in at least two pairs, bending resistant tension bar means operatively interconnecting said blade root means of a pair of wings so that bending moments caused by the lead-lag movements of said wing means are transmitted from said root means to the respective tension bar means, said tension bar means crossing each other to form a crossing, bearing means spaced from said central rotational axis and operatively supporting said tension bar means and said blade or wing means on said rotor head means, said bearing means permitting longitudinal movements of said tension bar means relative to said rotor head in the axial direction of said tension bar means as well as deflections of said tension bar means substantially at said crossing under the influence of said bending moments in the lead-lag direction, said rotor structure further comprising centering means operatively interconnecting said tension bar means substantially at said crossing to substantially prevent longitudinal movement of said tension bar means relative to said centering means, said centering means being arranged for displacement relative to said rotor head in the plane of rotation of the rotor in response to said deflections of said tension bar means, whereby mass unbalances caused by the lagging movement of the blade or wing means are at least partially balanced.

2. The rotor structure of claim 1, wherein said centering means comprise means permitting a relative movement of said tension bar means relative to each other in the direction of said central rotational axis of said rotor head means.

3. The rotor structure of claim 1, wherein said bearing means are blade angle bearing means, said structure further comprising means connecting said rotor blade or wing means to the respective tension bar means in a manner rigid against rotation about the longitudinal axis of the tension bar means, said centering means comprising axial thrust take-up bearing members each connected to one of the tension bar means.

4. The rotor structure of claim 3, wherein said axial thrust take-up bearing members further comprise radial thrust take-up members and means operatively interconnecting said bearing members, so as to permit a relative movement of said bearing members in the direction of said central rotational axis.

5. The rotor structure of claim 1, wherein said tension bar means comprise means permitting relative rotation of opposite ends of the tension bar means about the longitudinal axis of said tension bar means whereby the latter may be twisted through an angle corresponding to the collective angular movement of said blade or wing means.

6. The rotor structure of claim 5, wherein said tension bar means are made of a fiber reinforced plastic material, said tension bar means having a degree of torsional flexibility which permits said relative rotation of opposite tension bar ends.

* * * * *